United States Patent [19]

Kim

[11] Patent Number: 5,825,497
[45] Date of Patent: Oct. 20, 1998

[54] DEVICE FOR MEASURING HEIGHT OF OBJECT

[75] Inventor: Hyeong-cheol Kim, Seongnam, Rep. of Korea

[73] Assignee: Samsung Electronics Co., Ltd., Kyungki-do, Rep. of Korea

[21] Appl. No.: 903,306

[22] Filed: Jul. 30, 1997

[30] Foreign Application Priority Data

Oct. 24, 1996 [KR] Rep. of Korea ............... 96-48141

[51] Int. Cl.⁶ .................. G01B 11/14; G01N 21/00; G02F 1/33
[52] U.S. Cl. .................. 356/381; 356/375; 356/376; 356/387; 356/237; 250/559.06; 250/559.19; 250/559.22; 359/298; 359/299; 359/305; 359/312
[58] Field of Search .................. 356/375–376, 356/379, 381, 383, 384, 387, 237; 250/559.06, 559.14, 559.2, 559.22, 559.24, 559.26, 559.27; 359/298, 299, 305, 312

*Primary Examiner*—Frank G. Font
*Assistant Examiner*—Jason D. Vierra-Eisenberg
*Attorney, Agent, or Firm*—Burns, Doane, Swecker & Mathis, L.L.P.

[57] ABSTRACT

An object surface height measuring device with two acousto-optical modules for refracting light from a light emitter with predetermined refractive indices depending on frequency modulation so that the light is swept over the X and Y axes of an object, and two other acousto-optical modules synchronized with the signals of the first two acousto-optical modules, respectively, so that the light reflected from the object is focused onto a light receiving portion. The change in the height of the object is measured from the variation between the spot of light focused onto the light receiving portion and the center of the light receiver.

1 Claim, 1 Drawing Sheet

DEVICE FOR MEASURING HEIGHT OF OBJECT

BACKGROUND OF THE INVENTION

The present invention relates to a device for measuring the height of an object without moving the object or the measuring device.

In general, an object height measuring device finds its use in the determination of failure of an IC, detection of defects on the surface of glass, and in post-machining surface tests. Referring to FIG. 1, a conventional object height measuring device includes a light emitter 1 for emitting a laser beam, a lens 2 for focusing the laser beam on an object 3, and a light receiving portion 4 for sensing light scattered by the object 3. The object 3 is located on an XY table 5 which is horizontally movable.

In the operation of the conventional object surface height measuring device as constituted above, a laser beam emitted from the light emitter 1 is scattered by the object 3 and received in the light receiving portion 4. Since the received location of the incident laser beam on the light receiving portion 4 varies with the height of the object 3, the height of the object 3 can be determined from the variation of the received location. However, to measure the height of the object 3 at different points, the position of the object 3 must be changed by moving the XY table 5. Consequently, high-speed measuring is impossible and an error is introduced to the measuring results depending on the surface state and movement precision of the XY table 5.

SUMMARY OF THE INVENTION

To solve the above problems, the object of the present invention is to provide a device for accurately measuring the height of an object without moving the object or the measuring device.

To achieve the above object, there is provided an object height measuring device, comprising a light emitter for emitting light, a base for disposing an object thereon, a light receiving portion for receiving light emitted from the light emitter and reflected from the object, a first acousto-optical module installed between the light emitter and the base, for projecting the light to be swept in an X axis direction with respect to the object by refracting the light emitted from the light emitter with a predetermined refractive index depending on frequency modulation, a second acousto-optical module installed between the light emitter and the base, for projecting the light to be swept in a Y axis direction with respect to the object by refracting the light emitted from the light emitter with a predetermined refractive index depending on frequency modulation, a third acousto-optical module for being synchronized with a frequency signal of the first acousto-optical module and refracting light transmitted through the first acousto-optical module and reflected from the object with a predetermined refractive index depending on frequency modulation to be focused on the light receiving portion, a fourth acousto-optical module for being synchronized with a frequency signal of the second acousto-optical module and refracting light transmitted through the second acousto-optical module and reflected from the object with a predetermined refractive index depending on frequency modulation to be focused on the light receiving portion, and an electrical signal source for FM-modulating a triangular wave and applying the modulated signal to the first through fourth acousto-optical modules, wherein the change in the height of the object is measured from the variation between the position of the light focused on the light receiving portion and the center of the light receiving portion.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
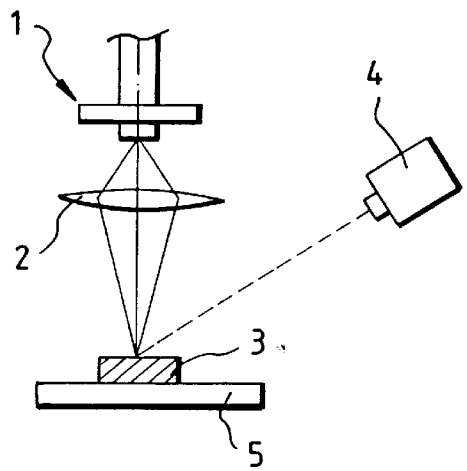
FIG. 1 is a schematic view of a conventional object height measuring device.
Figure 2:
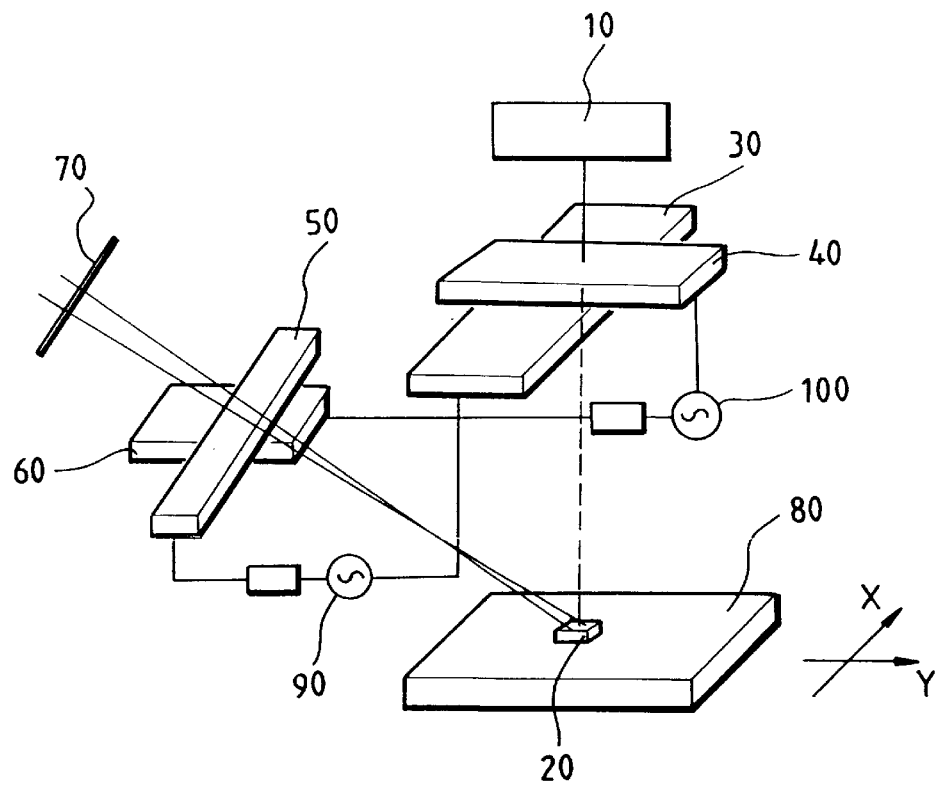
FIG. 2 is a schematic view of an object height measuring device according to the present invention.

Referring to FIG. 2, an object height measuring device of the present invention includes a light emitter 10 for emitting light, first and second acousto-optical modules 30 and 40 for transmitting the light emitted by the light emitter 10 and refracting the transmitted light with predetermined refractive indices depending on frequency modulation and projecting the light onto an object 20, third and fourth acousto-optical modules 50 and 60 for transmitting the light reflected from the object 20 and refracting the transmitted light with predetermined refractive indices depending on frequency modulation, and a light receiving portion 70 for receiving the light transmitted by the third and fourth acousto-optical modules 50 and 60.

When a triangular wave is FM-modulated and input to the first acousto-optical module 30, light emitted from the light emitter 10 is refracted according to the electrical signal and swept in an X axis direction of a base 80. Similarly, when a triangular wave is FM-modulated and input to the second acousto-optical module 40, light emitted from the light emitter 10 is refracted according to the electrical signal and swept in a Y axis direction of the base 80.

The third acousto-optical module 50, synchronized with that of the first acousto-optical module 30, focuses light reflected from the object 20 after passing through the first acousto-optical module 30 on an arbitrary point of the light receiving portion 70, and the fourth acousto-optical module 60, synchronized with that of the second acousto-optical module 40, focuses light reflected from the object 20 after passing through the second acousto-optical module 40 on an arbitrary point of the light receiving portion 70.

The thus-constituted object height measuring device according to the present invention is operated as follows.

Before the height of the object 20 is measured, the measuring device is initialized. That is, light is emitted from the light emitter 10 without the object 20 located on the base 80. Here, a voltage is not applied to the first through fourth acousto-optical modules 30 through 60. Therefore, the light emitted from the light emitter 10 is reflected from the base 80 and reaches the light receiving portion 70. Here, the initialization is completed by adjusting the device by a device adjusting means (not shown) to focus the reflected light on the center of the light receiving portion 70.

After the initialization, the object 20 is disposed on the base 80, and light is emitted from the light emitter 10. Here, a triangular wave is FM-modulated by an electrical signal source 90 and applied to the first acousto-optical module 30 in order to sweep the light in the X axis direction. Therefore, the light is transmitted through the first acousto-optical module 30 and swept in the X axis direction with respect to the object 20. Then, the light reflected from the object 20 is transmitted through the third acousto-optical module 50 synchronized with a signal of the first acousto-optical module 30 and focused to form a spot on the light receiving portion 70. The change of the height of the object 20 in the X axis direction can be measured from the variation between the light spot on the light receiving portion 70 and the center thereof.

In addition, to sweep the light in the Y axis direction, a triangular wave is FM-modulated by the electrical signal source 100 and applied to the second acousto-optical module 40. Therefore, the light is transmitted through the second acousto-optical module 40 and swept in the Y axis direction with respect to the object 20. Then, the light reflected from the object 20 is transmitted through the fourth acousto-optical module 60 synchronized with a signal of the second acousto-optical module 40 and focused to form a spot on the light receiving portion 70. The change of the height of the object 20 in the Y axis direction can be measured from the variation between the light spot on the light receiving portion 70 and the center thereof.

Accordingly, the height of the object 20 with respect to the X and Y axis directions can be measured, while electrical signals are simultaneously applied to the first through fourth acousto-optical modules 30 through 60.

According to the object height measuring device as described above, high-speed measuring is possible because the height of an object is measured without moving the object or the measuring device. In addition, the heights of the object in the X and Y axis directions can be measured by electric signals regardless of the flatness of a table on which the object is mounted, thereby increasing measuring reliability.

What is claimed is:

1. An object height measuring device comprising:

a light emitter for emitting light;

a base for disposing an object thereon;

a light receiving portion for receiving light emitted from said light emitter after said light has reflected from said object;

an electrical signal source for outputting a modulated signal based on FM-modulating a triangular wave and applying said modulated signal to said first through fourth acousto-optical modules;

a first acousto-optical module installed between said light emitter and said base, for sweeping said light in an X axis direction with respect to said object by refracting said light emitted from said light emitter with a predetermined refractive index which depends on said modulated signal;

a second acousto-optical module installed between said light emitter and said base, for sweeping said light in an Y axis direction with respect to said object by refracting said light emitted from said light emitter with a predetermined refractive index which depends on said modulated signal;

a third acousto-optical module which is synchronized with said modulated signal of said first acousto-optical module wherein the third acousto-optical module focuses the reflected light which was swept across said object by said first acousto-optical module on said light receiving portion;

a fourth acousto-optical module which is synchronized with said modulated signal of said second acousto-optical module wherein the fourth acousto-optical module focuses the reflected light which was swept across said object by said second acousto-optical module on said light receiving portion; and wherein a change in the height of said object is measured from the variation between the position of said light focused on said light receiving portion and the center of said light receiving portion.

* * * * *